US006906514B2

United States Patent
Ausserlechner

(10) Patent No.: US 6,906,514 B2
(45) Date of Patent: Jun. 14, 2005

(54) CONCEPT FOR COMPENSATING THE INFLUENCES OF EXTERNAL DISTURBING QUANTITIES ON PHYSICAL FUNCTIONAL PARAMETERS OF INTEGRATED CIRCUITS

(75) Inventor: Udo Ausserlechner, Villach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/841,869

(22) Filed: May 7, 2004

(65) Prior Publication Data

US 2005/0001487 A1 Jan. 6, 2005

Related U.S. Application Data

(63) Continuation of application No. PCT/EP02/11854, filed on Oct. 23, 2002.

(30) Foreign Application Priority Data

Nov. 7, 2001 (DE) .......................................... 101 54 495

(51) Int. Cl.$^7$ .............................................. G01R 33/07
(52) U.S. Cl. ........................ 324/251; 324/252; 324/225; 327/511; 257/427
(58) Field of Search .......................... 324/225, 251–252, 324/244, 260; 323/368, 293–294; 327/509–511; 257/421, 427

(56) References Cited

U.S. PATENT DOCUMENTS

| 4,929,993 A | 5/1990 | Popovic | 357/27 |
| 5,614,754 A | 3/1997 | Inoue | 257/421 |
| 5,686,827 A | 11/1997 | Ward | 323/368 |
| 6,158,267 A | 12/2000 | Fan | 73/1.77 |

FOREIGN PATENT DOCUMENTS

| DE | 37 13 901 A1 | 10/1987 | ........... H01L/27/22 |
| DE | 39 32 479 A1 | 4/1991 | ........... G01D/3/04 |
| DE | 44 34 318 A1 | 3/1996 | ........... G01D/3/028 |
| DE | 196 48 241 A1 | 7/1997 | ........... G01G/23/01 |
| DE | 199 43 128 A1 | 4/2001 | ........... G01R/33/07 |
| EP | 1 010 987 A2 | 12/1999 | ........... G01R/33/07 |
| EP | 1 108 896 A2 | 12/2000 | ............. F16B/5/01 |

Primary Examiner—Bot LeDynh
(74) Attorney, Agent, or Firm—Baker Botts L.L.P.

(57) ABSTRACT

A circuit for generating an output signal, which depends on a physical useful quantity includes means for detecting the physical useful quantity, wherein the means for detecting is arranged to generate an output signal, which depends on the physical useful quantity, a control signal for the means for detecting and, with an unchanged control signal, on an external control quantity. The circuit further includes sensor means for detecting the external disturbing quantity and for providing a sensor signal, which depends on the external disturbing quantity and means for processing the sensor signal to influence the control signal dependent on the sensor signal such that the influence of the external disturbing quantity on the output signal is reduced.

16 Claims, 3 Drawing Sheets

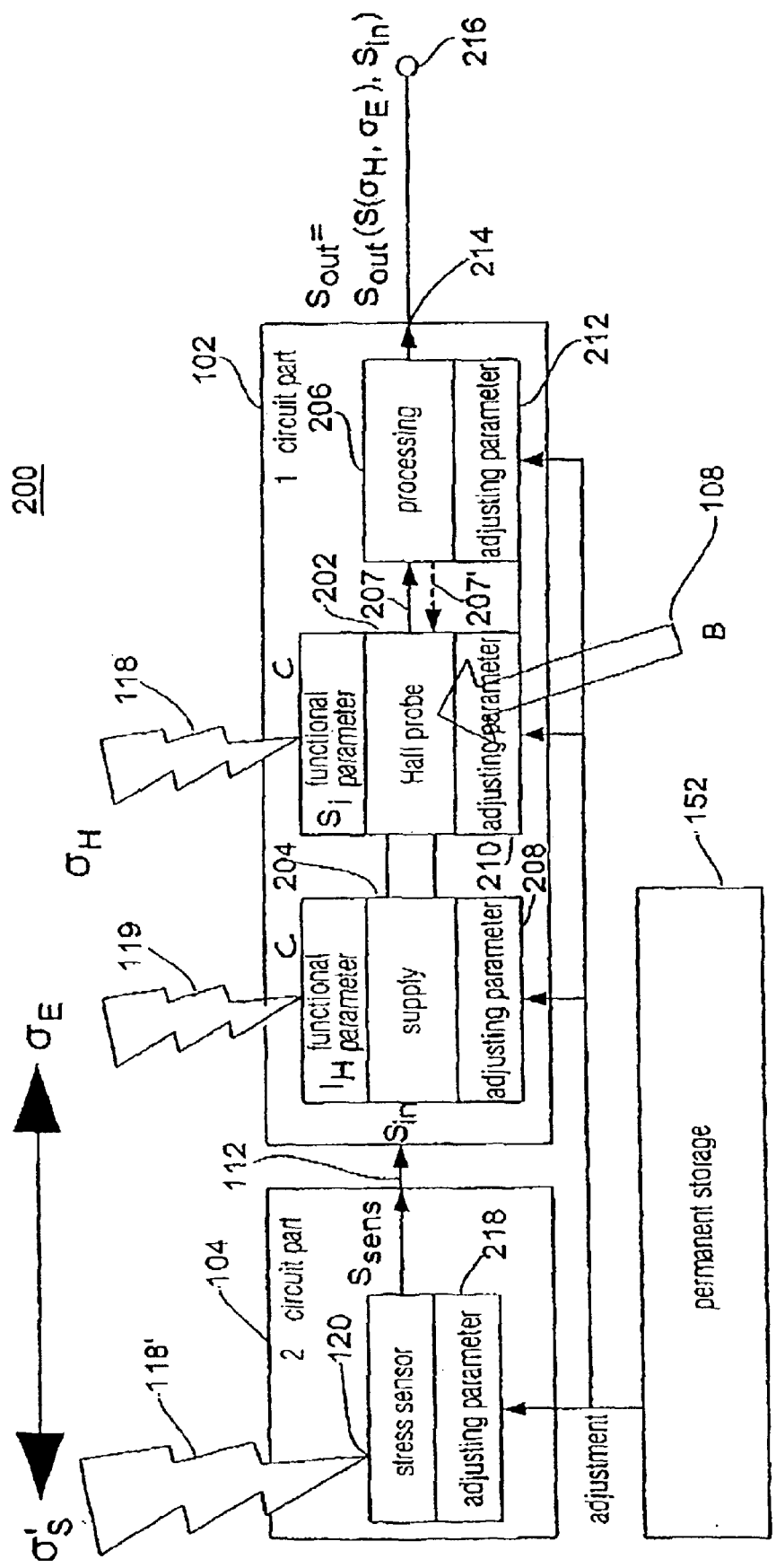

CONCEPT FOR COMPENSATING THE INFLUENCES OF EXTERNAL DISTURBING QUANTITIES ON PHYSICAL FUNCTIONAL PARAMETERS OF INTEGRATED CIRCUITS

CROSS REFERENCE TO RELATED APPLICATION

This application is a continuation of copending International Application No. PCT/EP02/11854, filed Oct. 23, 2002, which designated the United States, and claims priority to German application no. 101 54 495.2 filed Nov. 7, 2001.

TECHNICAL FIELD OF THE INVENTION

The present invention relates to integrated circuits and, in particular, to a system concept for decreasing or compensating influences of external disturbing quantities (disturbances), such as, for example, mechanical stress in a semiconductor material, on the physical functional parameters of integrated circuits.

DESCRIPTION OF RELATED ART AND BACKGROUND OF THE INVENTION

The problem with influencing physical functional parameters of integrated circuits by external disturbing quantities, such as, for example, by mechanical stress in the semiconductor material of the integrated circuit used, basically occurs in all semiconductor circuits, wherein this problem is found to be particularly annoying in integrated sensors since they use a physical functional parameter of the respective sensor element in order to thereby convert a physical useful quantity to be detected into an electrical output quantity. In practice, this physical functional parameter of the integrated circuit, in particular in silicon technology, is often influenced relatively strongly by mechanical stress in the semiconductor material.

In contrast to integrated sensors, this problem occurs less often in other integrated circuits since in this case an electrical input signal is almost always converted into an electrical output signal so that the absolute quantity of the physical parameter of the integrated circuit is not essential for its function, but only relative quantity ratios, cf. pair-tolerance, matching, of circuit parts associated to one another are relevant.

Integrated sensor assemblies, such as, for example, Hall probes, including their control and evaluating electronics (ASICs, ASIC=Application Specific IC), are increasingly used in large numbers in many applications, such as, for example, in the automobile industry, as current counters or in ventilator motors. Over the last few years it has also become possible in integrated circuit technology to separate, with the principle of the spinning current Hall probe, a disturbing offset signal of a Hall probe from the useful signal of the Hall probe by means of a mostly time-discrete signal processing.

With these integrated sensor assemblies, the possibility arises to manufacture very precise magnetic field sensors with extended additional functions, such as, for example, the possibility of programmability and so-called "smart sensors", in large numbers in a reliable and cost-effective way in reliable CMOS or BiCMOS technology with silicon as the semiconductor basic material. In particular due to this combination of advantages, discrete Hall probes, which were preferably used at some point, including their control circuits including direct semiconductor materials, such as, for example, GaAs and InSb, are being employed to an ever-decreasing extent. Direct semiconductor materials are such semiconductors in which the energy maximum of the valence band and the energy minimum of the conduction band are at identical crystal impulses.

Thus, certain disadvantages of indirect semiconductor materials, such as, for example, silicon or germanium, are becoming more and more evident, wherein indirect semiconductor materials are such semiconductors in which the energy maximum of the valence band and the energy minimum of the conducting band are at different crystal impulses. In indirect semiconductor materials, so-called piezo effects can be observed relatively frequently. In this context, piezo effects are changes of electrical parameters of the semiconductor material under the influence of a mechanical stress in the semiconductor material. With piezo effects, it is in particular differentiated between the piezo-resistive effect and the piezo-Hall effect in a semiconductor material.

The piezo-resistive effect indicates how the specific ohmic resistance $\rho$ of the respective semiconductor material behaves under the influence of a mechanical stress tensor, wherein the following applies:

$$\rho = \rho_0(1+\Sigma \pi_{i,j} \sigma_{i,j})$$

The piezo-Hall effect, in contrast, describes the dependence of the Hall constant on the mechanical stress condition in the semiconductor material, wherein the following applies:

$$R_h = R_{h0}(1+\Sigma P_{i,j} \sigma_{i,j})$$

Thus, $\sigma_{i,j}$ is the mechanical stress tensor, $\pi_{i,j}$ are the piezo-resistive coefficients, $P_{i,j}$ are the piezo-Hall coefficients, wherein the summation extends over i=1 . . . 3 and j=1 . . . 3.

Both effects are disturbing when operating a sensor assembly, such as, for example, an integrated Hall probe including control and evaluating electronics. The current-related sensitivity $S_i$ of the Hall probe, for example, changes by the piezo-Hall effect depending on how this functional parameter of the sensor assembly is influenced due to changes of the mechanical features of the sensor casing, wherein the following relation applies for the current-related sensitivity $S_i$ of the Hall probe:

$$S_i = \frac{U_h}{I_H B} = \frac{R_h}{t} G$$

Thus, $U_h$ is the Hall voltage on the output side of the Hall probe, $I_H$ is the current through the Hall probe, B is the magnetic flux density, t is the effective thickness of the active layer of the Hall probe and G is a geometry factor describing the influence of the contact electrodes on the Hall voltage.

In addition, the Hall current through the Hall probe changes as a consequence of the piezo-resistive effect when applying mechanical stress in the semiconductor material, since the Hall current is, for example, only defined via a resistor across which there may be a voltage in a control loop. A change of the Hall current due to a resistance change thus results in a change of the sensitivity S of the Hall probe, since it is identical to the product of current-related sensitivity $S_i$ times the Hall current $I_H$:

$$S = S_i I_H = U_h / B$$

In integrated sensor circuits housed in a casing, it is to be kept in mind that the casting compound of the casing generally has a different thermal expansion coefficient than the semiconductor material, such as, for example, the silicon chip, which is why the two components can tense up relative to each other at different temperatures similar to a bimetal strip. Tensile and compressive stress components occurring in the semiconductor material can easily reach an order of magnitude of 100 MPa(1 Pa=1 N/m$^2$) and can even result in mechanical damage of the chip, i.e. cracks on the surface of the chip or even breaking of the chip.

In the present invention, the focus of attention, however, is not directed to potential damage by mechanical stress in the semiconductor material but basically to the influence of physical parameters of the semiconductor material by these mechanical stress which can, for example, influence the electrical and magnetic characteristics of an integrated sensor assembly, such as, for example, a Hall sensor assembly.

The mechanical stress in the semiconductor material can, comparable to an elastic shape change work, be considered as a type of excitation energy which has to be added to the energy balance in the semiconductor material. In particular, mechanical stress in the semiconductor material results in a change of the band structure of the semiconductor. In indirect semiconductor materials, the result is a splitting of energy minima which are actually identical in a stress-free casing. As a further consequence, this causes a reoccupation of these energy minima with free charge carriers, wherein a predominant portion of the charge carriers will accept the state which, as far as energy is concerned, is more favorable. Since the bending of the band edges, i.e. the edges of the energy bands of the free charge carriers in the semiconductor crystal, i.e. the conduction band edge for the free electrons and the valence band edge for the free holes, is also different in the different energy minima, a different effective mass can be associated to the charge carriers in these energy minima, which is why their behavior differs as far as the charge carrier transport is concerned. In this way, mechanical stress in the semiconductor material has the effect that the features of the charge carriers change as far as the charge carrier transport is concerned, such as, for example, mobility, collision time, scattering factor and Hall constant.

So far, it has been impossible to keep this mechanical stress in a defined predetermined region during the entire lifetime and the entire temperature range of a sensor assembly. In addition, what aggravates the situation is that magnetic field sensors are cast in particularly thin casing types so that they can be inserted into small air gaps in the respective case of application since the narrower the air gaps, the higher the magnetic field in that gaps. No gel can be applied to the semiconductor chip supporting the sensor assembly for such thin casing types due to a lack of space, as is otherwise often employed to cast the semiconductor chip with little stress. In relation to the piezo-resistive effects in silicon, reference is, for example, made to the scientific publication by Yozo Kanda "A graphical representation of the piezo-resistive coefficients in silicon" in IEEE Trans. Electron Devices, Vol. ED-29, pp. 64–70, January 1982. In connection to integrated Hall probes, there are some studies indicating that a large part of the offset signal of these Hall sensors can be explained by the piezo-resistive effect, for this see U.S. Pat. No. 5,614,754 "Hall device", Aug. 2, 1994 by Kazuhiko Inoue and U.S. Pat. No. 4,025,941 "Hall element", Apr. 8, 1975 by Yozo Kanda et al.

In addition, there are extensive studies regarding the directional dependence of the piezo-resistive effect in n-and p-doped silicon for both light dopings below $10^{17}$ cm$^{-3}$ and for heavy dopings up to $10^{23}$ cm$^{-3}$, for this see "Piezo-resistance effect in germanium and silicon", Physical Rev., Vol. 94, pp. 42–49, 1954 and "Piezoresistive Properties of Heavily Doped n-Type Silicon" by O. N. Tufte and E. L. Stelzer, Physical Rev., Vol. 133, No. 6A, pp. A1705–1716, Mar. 16, 1964. In this regard, there is a well-established theory confirming the measuring results obtained by experiments quantitatively on the basis of the band structure of the semiconductor, see "Transport and deformation-potential theory for many-valley semiconductors with anisotropic scattering" by C. Herring and E. Vogt, Physical Rev., Vol. 101, pp. 944–961, 1956. In relation to studies and theoretical explanations of the piezo-Hall effect in n-doped silicon, reference is made to the scientific publication "Piezo-Hall coefficients of n-type silicon" by B. Halg, J. Appl. Phys., 64 (1), pp. 276–282, Jul. 1st, 1988.

The patent U.S. Pat. No. 4,929,993 relates to, for example, a Hall device having a blocking layer protection barrier. Referring to FIG. 17, it is illustrated there that the circuit, apart from a Hall element 22 and a current source 21, also comprises a control circuit assembly 24, 25, 26, 27. The thickness of the blocking layer 11 is to remain constant even when disturbing influences, such as, for example, a change of the ambient temperature, occur. In order to achieve this, the Hall element illustrated in FIG. 17 is to be switched always with the control circuit assembly 24, 25, 26, 27 keeping the depth of the blocking layer at a correct value. In this context, the field-effect transistor 32 serves as a temperature-sensitive element, the pinch-off voltage of which is inversely proportional to the square of the ambient temperature. The temperature of the Hall element 22 and of the field-effect transistor 32 are actually identical since these two components form a part of the same integrated circuit and are thus very close to each other. The control circuit assembly 24, 25, 26, 27 controls the thickness of the blocking layer in the Hall element 22 by comparing the output voltage of the actual value generator 24 to the set value supplied by the set value generator 25 by means of the difference generator 26, 27. The sum of the difference obtained between the set value and the actual value is supplied to the control input M of the Hall element 22. Since the field-effect transistor 32 is a temperature-sensitive component, the set value depends on the temperature. Thus, it is made possible for the control circuit assembly 24, 25, 26, 27 to regulate the thickness of the blocking layer to a value allowing the magnetic field sensitivity of the Hall element 22 to be set independently of the temperature.

The patent EP 1010987 A2 relates to, for example, a Hall sensor having means for orthogonally switching the Hall sensor supply current and the Hall voltage taps, wherein the geometry of the Hall plate, in the orthogonal position, is the same for the Hall voltage determination, and summing means which the Hall voltage values of the orthogonal positions can be supplied to for forming an offset-compensated Hall voltage value. Optionally, a stress measurement and a temperature measurement can be performed for a conventional magnetic field measurement. For a stress measurement, the Hall voltage values of the orthogonal positions are to be supplied to summing means and/or processible in summing means in such a way that the portions of the Hall voltage values due to the magnetic field compensate and only portions of the Hall voltage values due to the offset can be measured.

The patent U.S. Pat. No. 5,686,827 relates to a Hall effect device generating an electrical output signal when it is subjected to a magnetic field. An operating current for the Hall effect device is varied by an input circuit assembly in order to keep the output signal of the Hall effect device constant as regards variations of the temperature of the Hall effect device, while the magnetic field applied to the Hall effect device remains constant. The input circuit arrangement includes a temperature-sensitive element kept at a temperature varying as a function of the variations of the temperature of the Hall effect device. The temperature-sensitive element is embodied as a silicon diode.

The patent DE 3932479 A1 describes an arrangement for processing sensor signals. The arrangement serves for processing sensor signals provided by a measuring sensor and by one or several more sensors. The measuring sensor produces a measuring effect depending on a physical measuring quantity to be detected and on physical disturbing quantities, wherein each additional sensor generates a measuring effect basically only depending on physical disturbing quantities. The arrangement contains a signal processing circuit receiving the measuring effects as input quantities. The signal processing circuit, by analogue processing of the sensor signals, provides an output quantity, the relation of which to a reference quantities is determined by a transfer function defined in a special way in dependence on the measuring effects forming the input quantities. The coefficients of the transfer function can be set for obtaining the desired transfer behavior independence on the features of the measuring sensor, which is how the influence of the disturbing quantity on the measuring effect on the measuring sensor is compensated and errors are corrected in the relation between the measuring quantity and the measuring effect of the measuring sensor.

SUMMARY OF THE INVENTION

It is the object of the present invention to provide an improved concept for compensating disturbing influences on physical parameters of integrated circuits.

In accordance with a first aspect, the present invention provides a circuit for generating an output signal, which depends on a physical useful quantity, having: means for detecting the physical useful quantity, wherein the means for detecting is arranged to generate an output signal, which depends on the physical useful quantity, a control signal for the means for detecting and, with an unchanged control signal, on an external disturbing quantity; sensor means for detecting the external disturbing quantity and for providing a sensor signal, which depends on the external disturbing quantity; and means for processing the sensor signal to influence the control signal dependent on the sensor signal such that the influence of the external disturbing quantity on the output signal is reduced; wherein the circuit further has a memory in which information indicating the influence of the external disturbing quantity on the sensor signal, the control signal and/or the output signal can be stored.

In accordance with a second aspect, the present invention provides a method for generating an output signal, which depends on a physical useful quantity, having the following steps: detecting the physical useful quantity to generate an output signal which depends on the physical useful quantity, a control signal and, with an unchanged control signal, on an external disturbing quantity; detecting the external disturbing quantity and providing a sensor signal, which depends on the external disturbing quantity; processing the sensor signal to influence the control signal dependent on the sensor signal such that the influence of the external disturbing quantity on the sensor signal, the control signal and/or the output signal is reduced; and storing information indicating the influence of the external disturbing quantity on the output signal.

The present invention is based on the finding that the influence of an output signal of an integrated circuit by a disturbing quantity, such as, for example, by mechanical stress in the semiconductor material of the integrated circuit, can be decreased or compensated by forming a compensating circuit, such as, for example, a control loop, converting the essential components of the stress tensor acting on the semiconductor material in an on-chip stress sensor into a signal which can be electrical, electronic, thermal, mechanical, etc., wherein this signal is employed to control the integrated circuit, such as, for example, a sensor assembly, in such a way that the output signal of the integrated circuit is influenced selectively so that the influence of the external disturbing quantity, such as, for example, of the mechanical stress in the semiconductor material, on the output signal of the integrated circuit can be decreased considerably or compensated completely.

It is to be kept in mind in the context of the present invention that the inventive concept can be applied in a very general sense to any electronic circuits and to compensating the influence of a functional parameter of an electronic circuit by an external disturbing quantity. The functional parameter of the integrated circuit thus converts an applying physical useful quantity into an output signal of the electronic circuit, wherein in the context of the present invention the physical useful quantity can be an electrical, electronic, optical, mechanical, thermal etc. signal which, for example, represents a physical quantity to be detected by the electronic circuit, such as, for example, a magnetic field. It is important for the present invention that at least one output signal of the electronic circuit depends on the functional parameter influenced by the external disturbing quantity.

For better illustrating the present invention, it is of advantage to explain the inventive concept for compensating the influences of external disturbing quantities on the physical functional parameters of integrated circuits exemplarily with the help of integrated sensor circuits, such as, for example, Hall sensors, the functional parameters of which, i.e. the sensitivity S of which, is influenced by an external disturbing quantity, such as, for example, mechanical stress in the semiconductor material used, wherein it should be obvious that the present invention is not limited to Hall sensors only but basically applicable to any electronic semiconductor circuits.

When mechanical stress in the semiconductor material has an influence on an output signal of an integrated circuit, this mechanical stress in the semiconductor material must first of all be detected by means of measurement. Since the mechanical stress on the integrated circuit in the semiconductor material cannot be reproduced easily in general since they depend on the combination of the materials used and the processing parameters, such as, for example, curing temperature and curing time of the composite mass of the casing of the integrated circuit, a single characterization of all the parameters involved in the laboratory usually does not have desired result. Instead, the mechanical stress in the semiconductor material must be measured individually and continuously in each integrated circuit during operation. Thus, the inventive system for compensating influences of mechanical stress on the physical parameters in integrated circuits requires an on-chip stress sensor, wherein in this context mechanical stress is purely mechanical stress as it is described by a mechanical stress tensor.

The stress condition in a semiconductor material is, in general, to be illustrated as very complex since there are six independent components for the mechanical stress tensor alone. For the plane stress condition as it acts on the surface of an integrated circuit, the number of components of the stress tensor of interest can be reduced to three, i.e. to two normal stress components and a compressive stress component. In addition, it is evident that these components are not independent under the boundary conditions given. It also shows from numerical calculations and experimental data that the absolute quantity of the tensor components might be subjected to great scattering but their relation to one another is correlated considerably better.

The stress condition on the surface of the integrated circuit thus depends on the tracing point, i.e. it varies with the position on the semiconductor material. If the mechanical stress tensor is to be measured at a critical element on the semiconductor chip by means of a stress sensor, there will be the difficulty that the tensor can basically only be measured at a second location, i.e. at a location different from that of the integrated circuit. The inventive compensating concept takes this fact into consideration by assuming two different types of stress ($\sigma_{i,j}$ and $\sigma'_{i,j}$) at these two different locations and only assuming one predominantly deterministic relation between the two. Thus, $\sigma_{i,j}$ represents the mechanical stress at the location of the first circuit part influencing one/the functional parameter of the first circuit part, while $\sigma'_{i,j}$ represents the mechanical stress at the location of the second circuit part where the mechanical stress condition in the semiconductor material is detected.

As regards the predominantly deterministic relation, it is to be noted that there is, of course, always a stochastic component in all physical relations in technology. This component has to be sufficiently small in order for the inventive compensating concept to function. When the statistic portion is, for example, 50%, only half of the entire effect, i.e. of the influence of mechanical stress in the semiconductor material on the output signal, can be eliminated in an otherwise ideal compensation.

The cause of statistic fluctuations in the mechanical stress condition on the surface of the integrated circuit chip is predominantly given by the granular structure of the casting compound of the casing. This is the result of adding the highest possible percentage of quartz sand to the plastic material of the casting compound of the casing of a semiconductor chip to match the thermal expansion coefficient of the casting compound to that of silicon when silicon is used as the semiconductor material. The individual quartz grains can then press on the semiconductor surface and result in local fluctuations of the stress condition. These effects can be reduced by suitable passivation layers and polyimide layers on the semiconductor surface.

In order to counteract the influence of mechanical stress on a functional parameter of the integrated circuit, a signal proportional to the mechanical stress is used which is fed as an input or control signal into the integrated circuit and which is regulated actively in a compensating circuit against the influence of mechanical stress. The detailed explanation of this active regulation for compensating the influences of external disturbing quantities on the functional parameter of an electronic circuit is only indicated exemplarily at this point since there are a number of possibilities for this and also a number of points of application for this regulation for a compensation.

If an integrated Hall sensor is, for example, present, the sensitivity of which increases with mechanical stress, the current through this Hall probe could be regulated back to the same extent the sensitivity increases, so that the overall sensitivity of the product of probe sensitivity and probe current remains constant. In this case, the stress signal of the on-chip stress sensor controls that circuit generating the current through the Hall probe.

It is, however, also feasible that, for example, that amplifier amplifying the output signal of the Hall probe varies its amplification factor depending on the stress signal of the on-chip stress sensor (VGA amplifier, VGA=variable gain amplifier), wherein the VGA amplifier reduces its amplification to that extent to which the probe sensitivity increases by mechanical stress so that the product of the two in turn remains constant. A magnetic switching sensor is feasible as another case, which, when a certain magnetic field is exceeded, is to switch on an output signal. Assuming that the sensitivity of the Hall probe on the integrated circuit chip increases by mechanical stress, its output signal would already be switched on with smaller magnetic fields. Instead of the intervention mechanisms mentioned above for compensating the stress effect, this comparative signal which must be output by the Hall probe could be varied depending on the stress to switch the output. In this case, the stress signal of the on-chip stress sensor controls that circuit generating this comparative signal, wherein this comparative signal very often is a reference voltage of a comparator.

Only three simple embodiments have been indicated above which are to illustrate that practically any circuit block controlling the Hall probe or being controlled by it can be used to close the compensation control loop. At this point, an input signal, which is at the same time the output signal of the on-chip stress sensor, changes a functional parameter of the circuit block concerned to counteract the influence on the output signal by the mechanical stress and thus to compensate this influence.

Since the transfer functions involved in the compensation control loop are generally not known or not known sufficiently, adjustment must often take place. Thus, corresponding to the present invention, it is not required to determine the absolute value of different tensor components of the mechanical stress for adjusting. Instead, it is sufficient to compare two conditions having different types of unknown mechanical stress, wherein this is, for example, performed when manufacturing the integrated semiconductor circuit on the wafer level and after dicing the integrated circuit and housing it in a casing. If there are basically identical edge conditions in the test on the wafer level and the test after housing it in a casing, the change of the functional parameters of the electronic circuit can be traced back to the housing of the chip in a casing along and this change is compensated effectively by adjusting the transfer function of the compensating control loop in such a way that identical output signals occur with otherwise identical conditions for both instances of mechanical stress.

BRIEF DESCRIPTION OF THE DRAWINGS

Preferred embodiments of the present invention will be detailed subsequently referring to the appendage drawing in which:

FIG. 3 shows an integrated Hall sensor assembly for generating an output signal of the Hall sensor assembly independent in relation to mechanical stress in the semiconductor material according to another preferred embodiment of the present invention.

DETAILED DESCRIPTION OF EMBODIMENTS

As regards the general setup of an integrated circuit for generating an output signal independent in relation to external disturbing influences, the signal depending on a physical useful quantity of the integrated circuit, a comparative example will be explained in detail first of all referring to FIG. 1.

Figure 1:
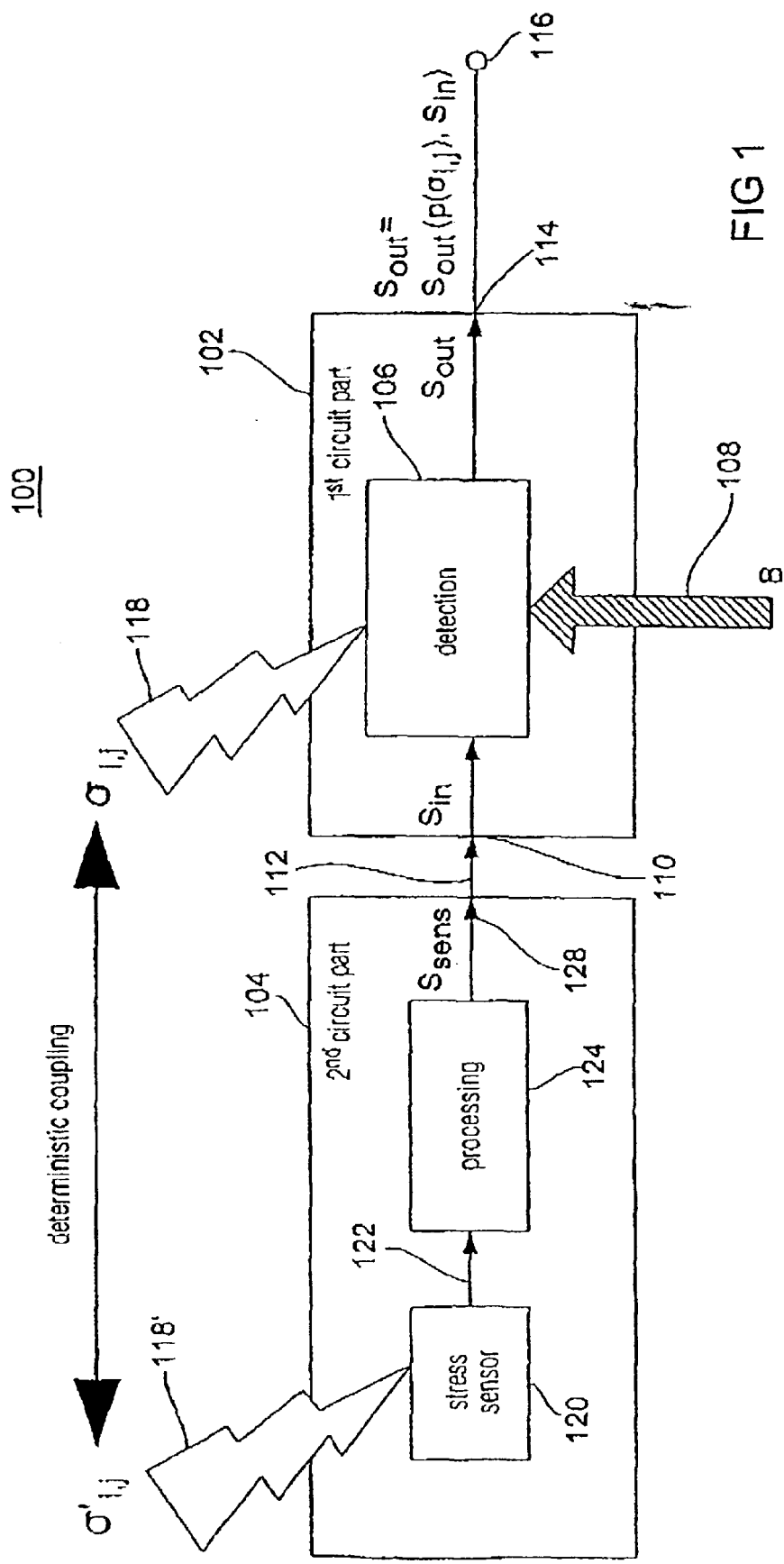
FIG. 1 shows an integrated circuit for generating an output signal independent in relation to disturbing quantities according to a comparative example.

As it is shown in FIG. 1, the integrated circuit 100 comprises a first circuit part 102 and a second circuit part 104. The first circuit part 102 includes means 106 for detecting a physical useful quantity 108 by means of a functional parameter of the means 106 for detecting, wherein the physical useful quantity 108, in the case of a Hall sensor element, is, for example, a magnetic field B to be detected.

In the context of the present invention, the expression "physical useful quantity" is, however, to be construed in a very general sense since the physical useful quantity can be an electrical, electronic, optical, mechanical, thermal, etc. signal which, for example, represents a physical quantity to be detected or to be processed by the electronic circuit.

The first circuit part 102 of the integrated circuit 100 further includes an input 110 for accepting a control signal 112 ($S_{sens}$) and an output 114 for outputting an output signal 116 ($S_{out}$). The output signal 116 thus depends on the physical useful quantity 108, on the control signal 112 and, with an unchanged control signal 112, on an external disturbing quantity 118. The useful quantity 108 enters into the output signal of the first circuit part 102 via the functional parameter of the first circuit part 102, i.e. means 106 for detecting a physical useful quantity, wherein the functional parameter is influenced by the disturbing quantity 118 ($\sigma_{i,j}$) at the location of the first circuit part 102.

The second circuit part 104 of the integrated circuit 100 includes sensor means 120 for detecting an external disturbing quantity 118' ($\sigma'_{i,j}$) at the location of the second circuit part 104 and for providing a sensor signal 122 depending on the external disturbing quantity 118' detected. The second circuit part 104 further includes means 124 for processing the sensor signal 122 to generate, depending on the sensor signal 122, the control signal 112 provided to the input 110 of the first circuit part 102 to reduce the influence of the external disturbing quantity 118 at the location of the first circuit part 102 via the measurement of the external disturbing quantity 118' at the location of the second circuit part 104 on the output signal 116 of the integrated circuit 100. It is to be noted that the detecting means 120 and the processing means 124 can also be embodied as a common circuit component. The control signal 112 of means 124 is provided to an output 128 of the second circuit part 104, wherein the output 128 of the second circuit part 104 is connected to the input 110 of the first circuit part 102 in order to be able to supply the control signal 112 generated by the processing means 124 to the first circuit part 102 for compensation.

The integrated circuit 100 is usually arranged on a semiconductor substrate, wherein the external disturbing quantity 118 is, for example, mechanical stress in the semiconductor substrate, influencing the output signal 116 of the integrated circuit 100. The sensor means 120 for detecting the external disturbing quantity 118' is, for example, a stress sensor for detecting at least one component of the mechanical stress in the semiconductor substrate. In general, the first circuit part 102 and the second circuit part 104 of the integrated circuit 100 are arranged on the semiconductor substrate in such a way that the external disturbing quantity 118, such as, for example, mechanical stress in the semiconductor material, acting on the first circuit part 102 and influencing the output signal 116 of the integrated circuit 100, is in an essentially deterministic relation to the detected external disturbing quantity 118' detected by the sensor means 120 in the second circuit part 104.

This basically deterministic relation between the external disturbing quantity 118, such as, for example, mechanical stress in the region of the first circuit part 102, and the external disturbing quantity 118' detected, such as, for example, mechanical stress in the region of the second circuit part 104, is considered by the means 124 for processing the sensor signal 122 as far as processing is concerned to influence the control signal 122 depending on the sensor signal 122 such that the influence of the external disturbing quantity 118 on the output signal 116 of the integrated circuit is compensated or at least reduced.

In order to keep the relation between the external disturbing quantity 118' acting on the sensor means 120 in the second circuit part 104 and the external disturbing quantity 118 acting on the means 106 for detecting a physical useful quantity 108 in the first circuit part 102 and thus on the output signal 116 of the integrated circuit 100 in a relation deterministic to the largest extent possible, in practice the sensor means 120 and the detecting means 106 are usually interleaved or arranged directly next to each other on the semiconductor substrate. Subsequently, the functionality of the integrated circuit 100 illustrated in FIG. 1 for generating an output signal 116 depending on a physical useful quantity 108 will be explained in detail.

As is illustrated in FIG. 1, the integrated circuit 100 includes two circuit parts 102, 104. The first circuit part 102 generates an output signal 116 depending on at least one functional parameter of this first circuit part 102, which is, in turn, influenced by an external disturbing quantity 118, such as, for example, by the influence of the mechanical stress condition 118 ($\sigma_{i,j}$) on the first circuit part 102. This mechanical stress condition 118 is detected via the second circuit part 104 and mapped to a control signal 112 serving as the input signal 112 into the core, i.e. into the detecting means 106, of the first circuit part 102 and counteracting the influence of the mechanical stress on the functional parameter of the first circuit part 102 so that altogether the disturbing influence of the external disturbing quantity, i.e. of the mechanical stress 118 ($\sigma_{i,j}$), on the output signal 116 of the detecting means 106 is reduced or eliminated as far as possible.

The core 106 of the first circuit part 102 thus is an electronic circuit in the most general meaning. It can, for example, be a smart sensor or a signal-processing circuit. In particular, this circuit core 106 of the first circuit part 102 might also have other input signals and output signals. It is only important in the present case that at least one output signal is influenced by a functional parameter. If, for example, the core of the first circuit part 106 is an integrated Hall sensor including evaluating electronics, the current-related magnetic sensitivity $S_i$ of the Hall probe is to be considered as a functional parameter which, as a consequence of the piezo-Hall effect, is influenced depending on the extent of the mechanical stress of the semiconductor material.

An integrated resistor could, for example, be used as a sensor 120 for detecting the mechanical stress 118' of the semiconductor material, the resistor, as a consequence of the piezo-resistive effect, being influenced by the mechanical stress condition in the semiconductor material. A current source could be considered as the means 124 for processing the sensor signal 122, which here has the effect of a compensating circuit, the source defining a control current by means of the integrated resistance mentioned before and impressing it into the Hall probe 106, wherein this current is changed to the same extent the current-related sensitivity $S_i$ of the Hall probe changes so that the output signal of the Hall probe remains uninfluenced by the mechanical stress condition 118 in the semiconductor material.

It is to be noted in the present invention that signals are intentionally described in a general sense only. These signals need not be electrical or electronic signals, they could, for example, also be partly thermal or mechanical. In case these signals are, however, electrical, they can be both voltages and currents. In a more abstract sense, the signals can also be pure information, such as, for example, in the form of bit currents.

The differentiation between the mechanical stress conditions 118, 118' ($\sigma_{i,j}$, $\sigma'_{i,j}$) in the region of the first and second circuit parts 102, 104, respectively, in the semiconductor material has the following meaning. Since the mechanical stress in general is not distributed homogeneously over the semiconductor substrate, it has to be assumed that the mechanical stress 118 influencing the first circuit part 102 differs from the mechanical stress 118' detected by the second circuit part 104. In a strict mathematical sense, this relation is valid practically always. In practice, it can be achieved to a sufficiently precise extent by means of suitable layout measures that the first stress condition 118 ($\sigma_{i,j}$) acting on the first circuit part 102 and the mechanical stress component 118' ($\sigma'_{i,j}$) acting on the second circuit part 104 match by, for example, interleaving the first and second circuit parts 102, 104 or by arranging them in a close abutting relation to each other. Even when the first and second circuit parts 102, 104 are arranged at different locations on the semiconductor substrate, a predominantly deterministic dependence or a predominantly deterministic relation between the mechanical stress 118, 118' can be assumed at both locations. Thus, a compensation control loop which includes "the functional parameter of the processing means 106—the mechanical stress in the semiconductor material 118, 118' ($\sigma_{i,j}$, $\sigma'_{i,j}$)—of the sensor means 120—of the processing means 124" for compensating the influence of the functional parameter and thus the output signal of the integrated circuit 100 can be effective.

The deterministic coupling between the mechanical stress 118, 118' ($\sigma_{i,j}$ and $\sigma'_{i,j}$), i.e. between the actual mechanical stress 118 acting on the functional parameter of the first circuit part 102 and the mechanical stress 118' detected in the second circuit part, will always be superimposed by a stochastic component, wherein it is, for example, conceivable that quartz grains embedded in the casting compound of a casing for the integrated circuit, press at arbitrary locations of the surface of the integrated circuit and thus cause a local increase of the mechanical stress. Even in this case, any precise mean value formation can take place and thus a quasi-deterministic relation between the mechanical stress 118 actually acting on the functional parameter of the first circuit part 102 and the mechanical stress 118' detected in the second circuit part can be made via sufficiently large sensors in the second circuit part 104 for detecting the mechanical stress in the semiconductor material and by a sufficiently large stress-sensitivity detecting means 106 in the first circuit part 102, the functional parameter of which is influenced.

A first inventive embodiment of an integrated circuit 150 for generating an output signal, which depends on a physical useful quantity will be explained in detail subsequently referring to FIG. 2.

Figure 2:
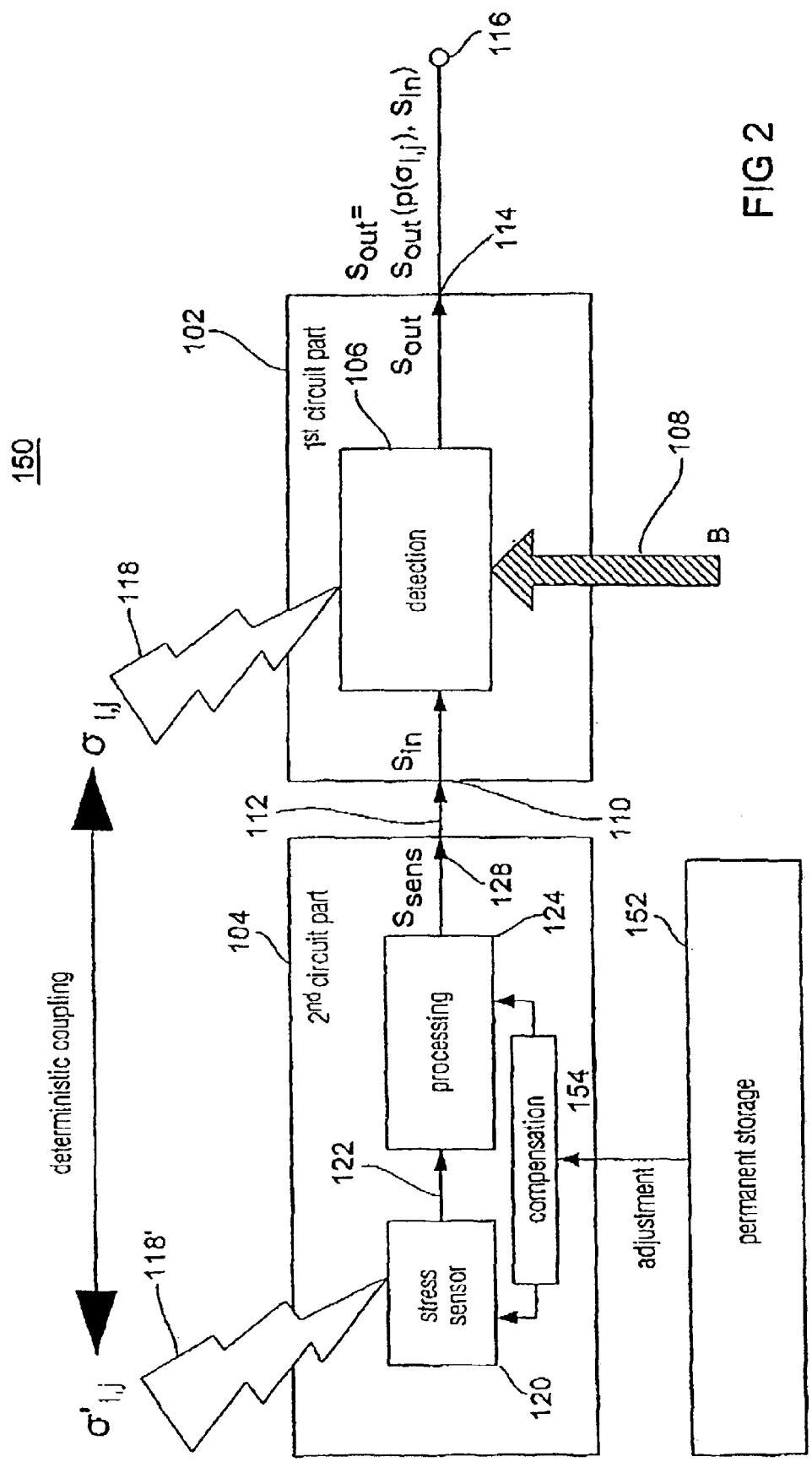
FIG. 2 shows an integrated circuit for generating an output signal independent in relation to disturbing quantities according to a first preferred embodiment of the present invention.

The circuit elements of the integrated circuit 150 illustrated in FIG. 2, identical to the circuit part of the integrated circuit 100 illustrated in FIG. 1, are given the same reference numerals and will not be detailed again.

The integrated circuit 150 illustrated in FIG. 2, like the integrated circuit 100 already explained referring to FIG. 1, comprises two circuit parts 102, 104. The first circuit part 102 includes means 106 for detecting a physical useful quantity 108, which, in the case of a Hall sensor element, is, for example, the magnetic field to be detected.

The first circuit part 102 of the integrated circuit 150 also includes an input 110 for accepting a control signal 112 and an output 114 for outputting an output signal 116 ($S_{out}$). The output signal 116 thus depends on the physical useful quantity 108, on the control signal 112 and, with an unchanged control signal 112, on an external disturbing quantity 118. The useful quantity enters into the output signal of the first circuit part 102 via the functional parameter of the first circuit part 102, wherein the functional parameter is influenced by the disturbing quantity 118 ($\sigma_{i,j}$) at the location of the first circuit part 102.

The second circuit part 104 of the integrated circuit 150 includes sensor means 120 for detecting an external disturbing quantity 118' which is in a basically deterministic relation to the mechanical stress 118 acting on the first circuit part, and for providing a sensor signal 122 depending on the external disturbing quantity 118' detected. The second circuit part 104 further includes means 124 for processing the sensor signal 122 to influence the control signal 112 ($S_{sens}$) depending on the sensor signal 122 in such a way that the influence of the external disturbing quantity 118 on the output signal 116 of the integrated circuit 150 is reduced or compensated. The control signal 112 of the means 124 is provided to an output 128 of the second circuit part 104, wherein the output 128 of the second circuit part 104 is connected to the input 110 of the first circuit part 102.

The integrated circuit 150 is usually arranged on a semiconductor substrate, wherein the external disturbing quantities 118, 118' is, for example, mechanical stress in the semiconductor substrate influencing the output signal 116 of the integrated circuit 150. The sensor means 120 for detecting the external disturbing quantity 118' is, for example, a stress sensor for detecting at least one component of the mechanical stress in the semiconductor substrate. In general, the first circuit part 102 and the second circuit part 104 of the integrated circuit 150 are arranged on the semiconductor substrate such that the external disturbing quantity 118, such as, for example, mechanical stress in the semiconductor material, influencing the output signal 116 of the integrated circuit 150, is in a basically well-known and deterministic relation to the external disturbing quantity 118' detected by the sensor means 120.

In addition, the integrated circuit 150 illustrated in FIG. 2, in contrast to the integrated circuit 100 illustrated in FIG. 1, comprises a memory 152, such as, for example, a permanent memory. The integrated circuit 150 additionally comprises compensating means 154 in the second circuit part 104.

When the integrated circuit 150 is housed in a casing, information will be stored in the storage 152, indicating the influence of the external disturbing quantity 118 due to the housing of the integrated circuit 150 in a casing. Compensating means 154 is provided to influence the control, signal 112 depending on the information stored in the memory 152 to compensate the influence of the external disturbing quantity 118 on the output signal 116 due to the housing of the integrated circuit 150 in a casing. Thus, it is also possible for the compensating means 154 to influence the sensor means 120 or the sensor signal 122 of the sensor means 120.

The precise functionality of the integrated circuit 150 illustrated in FIG. 2 will be detailed subsequently.

In order to set a completest possible compensation of the influence of the functional parameter/s of the detecting means 106 by mechanical stress 118 ($\sigma_{i,j}$)' all the transfer functions of the compensation control loop which includes "the functional parameter of the means 106 for detecting a physical useful quantity—the mechanical stress 118 ($\sigma_{i,j}$) acting on the means 106—the mechanical thermal coupling between the mechanical stress 118 ($\sigma_{i,j}$) acting on the means 106 and the mechanical stress 118' ($\sigma'_{i,j}$) detected by the detecting means 120—the mechanical stress 118' ($\sigma'_{i,j}$) detected by the means 120 for detecting an external disturbing quantity—the stress sensor 120—the processing means 124—the compensating current 14" must be known.

In the isolated case, this may, however, be only obtainable in a very complex way since this is a combined electronic-mechanical-thermal problem, wherein a part of the control loop, i.e. the stress tensor $\sigma_{i,j}$ and the coupling between the external disturbing quantity 118' acting on the sensor means 120 in the second circuit part 104 and the external disturbing quantity 118 acting on the means 106 for detecting a physical useful quantity 108 in the first circuit part 102 is of purely mechanical nature. The mechanical-thermal features thus depend on the casing type, the materials used, such as, for example the lead frame alloy, the adhesive for mounting the chip, the chemical composition of the casting compound, and the portion of the quartz filling substances and on the processing procedure, i.e. the curing temperature and the curing times of casting compounds and adhesive. Sometimes, these parameters change according to the equipment used in the manufacturing line without the circuit developer having been consulted, since the reaction of the mechanical-thermal features on the analogue behavior of circuits is neither obvious nor known sufficiently. Thus, adjusting the compensation control loop is mostly required even in small changes in the manufacturing steps.

For adjusting, the following procedure is preferred corresponding to the present invention. The integrated circuit 150 is at first measured on the wafer level (disc level), wherein this measurement will subsequently be referred to as wafer test. subsequently, the wafer is diced and the integrated circuit 150 is mounted in the casing. After that, the integrated circuit 150 is measured again within the casing, wherein this measurement will subsequently be referred to as end test. In the wafer test, a test point is set for this, where the integrated circuit 150 is brought to a defined state subsequently referred to as state Z, wherein internal registers, for example, are charged, a defined supply voltage is supplied, a defined temperature is applied and maybe further physically relevant quantities are impressed correspondingly. When the integrated circuit 150 is a magnetic field sensor, a defined magnetic field will, for example, be applied. After that the output signal 116 ($S_{out}$) of the integrated circuit 150, such as, for example, an output voltage $S_{out}$(Z, wafer test), is measured. In the end test, a test point analogue to this is set where the integrated circuit 150 is brought to the same test state Z and the output signal 116 of it, i.e. the output voltage $S_{out}$(Z, end test), is detected. If one succeeds to exactly reproduce the test state Z, all the changes between the two output voltages can be traced back to detrimental influences of the casing in the form of mechanical stress in the semiconductor material.

For compensation, adjusting is performed in the end test, wherein intervention into the second circuit part is performed by influencing the compensating means 154 which in turn acts on either the sensor means 120 and/or the means 124 for processing the sensor signal 122 until it applies that the output signal $S_{out}$(Z, wafer test) during the wafer test under the state Z is as equal as possible to the output signal $S_{out}$(Z, end test) during the end test under the state Z, i.e. until $S_{out}$(Z, wafer test)=$S_{out}$(Z, end test). Thus, the transfer function of the compensating control loop including "the functional parameter of the means 106 for detecting a physical useful quantity—the mechanical stress 118 ($\sigma_{i,j}$) acting on the means 106—the mechanical-thermal coupling between the mechanical stress 118 ($\sigma_{i,j}$) acting on the means 106 and the mechanical stress 118' ($\sigma'_{i,j}$) acting on the detecting means 120—the mechanical stress 118' ($\sigma'_{i,j}$) detected by the means 120 for detecting an external disturbing quantity—the stress sensor 120—the processing means 124—the compensating circuit 154" is adjusted such that it compensates the influence of the casing stress on the output signal 116.

An example of the intervention of the compensating means 154 into the second circuit part 104 could be to change the sensitivity of the stress sensor 120 in relation to mechanical stress 118 in the semiconductor substrate. As an equivalent, amplification in the processing means 124 can, however, also be made settable. Both are examples in which the features, such as, for example, the amplification, of the compensating control loop are changed. It is, however, also conceivable to make the time-behavior of the compensating control loop, i.e. its phase response, adjustable or to add a settable signal within the control loop to adjust, for example, an amplifier or sensor offset.

It is also possible to define a state Zw during the wafer test and a state Ze different from it during the end test when the pertaining output signals (such as, e.g., output voltages) can be recalculated into one another without influencing the casing stress, i.e. when it applies that the output signal during the wafer test in the state Ze is a function of the output signal during the wafer test in the state Zw, wherein it applies that $S_{out}$(Zw, wafer test)=f($S_{out}$(Zw, wafer test)) so that the condition $S_{out}$(Ze, end test)=f($S_{out}$(Zw, wafer test)) must be strived for when adjusting the integrated circuit 150 in the end test.

The memory 152 is required in order to make the result of the adjusting mentioned above permanent. This may be present in an analogue or digital form. Laser-trimmed reference resistors may, for example, be employed as analogue permanent memories, wherein Zener-Zapping or cavity fuses may, for example, be employed as digital permanent memories EEPROMS. The only prerequisite is that this memory can be programmed after mounting the chip in the casing. The results of the wafer test $S_{out}$(Z, wafer test) must be associable individually for each integrated circuit. For this, the integrated circuit 150 could, for example, be equipped with an EEPROM memory which the wafer result is stored in and read out from in the end test. Another way is to perform another adjustment on the wafer so that the result of the output signal during the wafer test in the state Z, i.e. $S_{out}$(Z, wafer test), is a constant identical for all functioning integrated circuits 150. Thus, the individual association can be omitted.

Another embodiment of the present invention for compensating the influences of external disturbing signals, such as, for example, mechanical stress, on integrated circuits will be detailed subsequently referring to FIG. 3, wherein the inventive principle is now applied to an integrated Hall sensor assembly 200.

The elements of the integrated Hall sensor assembly 200 illustrated in FIG. 3 which are equivalent to the elements of the integrated circuits 100, 150 illustrated in FIGS. 1 and 2 will again be given the same reference numerals, wherein a repeated detailed explanation of these elements will be omitted.

FIG. 3 shows an integrated Hall sensor 200 comprising a first circuit part 102 and a second circuit part 104. The first circuit part 102 of the integrated Hall sensor assembly 200 comprises a Hall probe 202, means 204 for supplying or controlling the Hall probe 202 and means 206 for processing an output signal 207 of the Hall probe 202.

As is illustrated in principle in FIG. 3, the magnetic sensitivity of the Hall probe 202 is influenced on the one hand by mechanical stress 118 ($\sigma_H$) on the Hall probe 202, i.e. by an effect known as piezo-Hall effect, and on the other hand the magnetic sensitivity of the Hall probe 202 is also influenced by mechanical stress 119 ($\sigma_E$) on the circuit 202 for supplying energy to the Hall probe 202.

The supply means 204, as an operating quantity, has a control current $I_H$ for the Hall probe 202. The supply means 204 further includes an adjusting parameter 208 by means of which the operating quantity $I_H$ can be set to compensate the influence of the external disturbing quantity 119 ($\sigma_E$) on the operating quantity $I_H$. The supply means 204 is connected to the Hall probe 202. The Hall probe 202 as a functional parameter comprises its current-related magnetic sensitivity $S_i$, wherein this functional parameter uses the respective sensor element to convert a physical useful quantity 108, i.e. the magnetic field B to be detected, into an electrical output signal 216 ($S_{out}$) of the integrated circuit 200.

The Hall probe 202 additionally comprises an adjusting parameter 210 by means of which the influence by the external disturbing quantity $\sigma_H$ can be compensated. The Hall probe 202 is optionally connected to the processing means 206 in a bi-directional way. The processing means 206 comprises an adjusting parameter 212. The output 214 of the processing means 206 also forms the output of the first circuit part 102 where the output signal 216 ($S_{out}$) of the integrated Hall probe assembly 200 can be tapped. The second circuit part 104 of the integrated Hall sensor assembly 200 further comprises a stress sensor 120, wherein the stress sensor 120 further comprises an adjusting parameter 218. The output signal 122 ($S_{sens}$) of the stress sensor 120 forms the output signal of the second circuit part 104 and additionally the input signal of the first circuit part 102. The integrated Hall sensor arrangement also comprises a permanent memory 152 connected to the first circuit part 102, i.e. the supply means 204, the Hall probe 202 and the processing means 206, respectively. The permanent memory 152 is further connected to the second circuit part 104 and, in particular, to the stress sensor 120 in the second circuit part 104.

The functionality of the integrated Hall sensor assembly 200 illustrated in FIG. 3 and, in particular, the compensation of the influences of mechanical stress on the physical functional parameter of the integrated Hall sensor assembly 202 will be detailed subsequently.

As is illustrated in FIG. 3, the first circuit part of the integrated Hall sensor assembly 200 includes one integrated Hall probe 202, supply means 204 for supplying the Hall probe 202 with electrical energy, and means 206 for processing the output signal 207 of the Hall probe 202. The arrow 207' indicated in a broken line between the processing means 206 and the Hall probe 202 is to indicate that optionally the signal flow can partly be fed back from the processing means 206 into the Hall probe 202. The processing of the output signal 207 of the Hall probe 202 in the processing means 206 is to be considered as very general in the present case. It can, for example, be a simple amplification, wherein it can, however, also be a complex switching function wherein when obtaining certain switching thresholds the output signal 166 of the first circuit part 102 can be switched on or off. In particular, complex signal processing algorithms can be contained in the processing means 206.

The first circuit part 102 also comprises at least one output signal 216 ($S_{out}$) depending on the functional parameter, such as, for example, the current-related magnetic sensitivity Si of the Hall probe. The first circuit part 102 of the integrated circuit 200 further includes at least one input signal 112 counteracting the influence of the output signal by the external disturbing quantities mentioned above. The possibilities of this counteraction are various.

In such circuits, the mechanical stress 118 ($\sigma_H$) in the semiconductor material on the one hand influences the current-related sensitivity $S_i$ of the Hall probe 202, wherein the mechanical stress 119 ($\sigma_E$) on the other hand also influences the operating parameter of the supply means 204 and thus the control current IR through the Hall probe. The sensitivity ($S = S_i \times I_H$) of the Hall probe 202 is influenced by this. In order to reduce this influence, the mechanic stress 118' ($\sigma_s$) in the semiconductor material is detected by the sensor means 120 and converted into a suitable sensor signal 112 supplied to the first circuit part 102. The input signal 112 of the first circuit part 102 is not associated to a single block in the first circuit part 102, since it may act on any block, i.e. on the Hall probe 202, on the supply means 204 and/or on the processing means 206 of the first circuit part 102. The only prerequisite is that a large part must counteract the effect of the mechanical stress 118, 119 ($\sigma_H$, $\sigma_E$) on the output signal 116 of the integrated Hall sensor assembly 200. This can theoretically also only take place in the processing means 206 of the first circuit part 102.

It becomes obvious from FIG. 3 that in the inventive integrated Hall sensor assembly 200 the adjustment of the compensating condition can be performed via the permanent memory 152 at each of the blocks, i.e. the sensor means 120, the Hall probe 202, the supply means 204 and/or the processing means 206.

As has already been indicated, the magnetic sensitivity of the Hall probe 202 is influenced on the one hand by mechanical stress 118 ($\sigma_H$) on the Hall probe 202, i.e. by an effect known as the piezo-Hall effect, wherein on the other hand, the current-related magnetic sensitivity of the Hall probe 202 is also influenced by mechanical stress 119 ($\sigma_E$) on the circuit 204 for supplying the Hall probe 202 with energy.

The second circuit part 104 of the integrated circuit 200 includes at least one sensor element 120 converting at least one component acting on it of the mechanical stress tensor 118' ($\sigma_s$) into a sensor signal 122 and supplying this signal to said input of the first circuit part 102.

There is a predominantly deterministic relation between this component 118' ($\sigma_s$) of the stress tensor at the location of the sensor element 120 and at least one essential component of the stress tensor 118, 119 ($\sigma_H$, $\sigma_E$) at the location of the Hall probe 202 and/or at the location of the circuit 204 for supplying the Hall probe 202 with energy, wherein reference is made to the description of FIGS. 1 and 2 for a detailed explanation of the deterministic relation.

The compensating control circuit including the operating parameter/s of the first circuit part 102—the mechanical stress on parts of the first circuit part—the mechanical-thermal coupling between the mechanical stress—the mechanical stress on parts of the second circuit part—the stress sensor—the sensor signal—the input signal of the first circuit part—parts of the first circuit part on which the input signal acts is then dimensioned in such a way that the output signal of the first circuit part 102 is to the largest extent possible independent of the mechanical stress of the integrated circuit chip 200 as they are caused, for example, by an IC casing.

The integrated circuit 200 additionally comprises a permanent memory 152 programmed after mounting the building block. The contents of the permanent memory 152 influence at least one parameter of the above compensating control loop. It is selected such that the output signal 216 of the integrated circuit 200 is to the largest degree possible independent of the mechanical stress condition 118. 119 ($\sigma_H$, $\sigma_E$) of the semiconductor material.

The adjustment according to the present invention is performed as follows in an integrated Hall sensor assembly 200. For a wafer test, a test point is set where the integrated circuit chip is subjected to a condition Z characterized by a defined magnetic field B, a defined temperature, a defined supply voltage, a defined switching and/or a defined contents of all the active memory cells. Thus, an output signal $S_{out}$ (Z, wafer test) forms. After dicing the integrated circuit chips and after mounting the casing, an end test is performed where the integrated circuit chip, for a test point, is subjected to the same conditions Z. An output signal $S_{out}$ (Z, end test) forms.

During the end test, an adjusting procedure varying one or several operating parameters of the above compensation control loop and finally selects those optimum operating parameters for which it then applies that $S_{out}$ (Z, end test)–$S_{out}$ (Z, wafer test) is minimal is performed. The operating parameter/s or an analogue/digital code for suitably influencing this operating parameter is/are then programmed into the permanent memory.

Referring to the inventive embodiments described in FIGS. 2 and 3, it is also to be noted that the expressions "wafer test" and "end test" used for the individual circuit tests have only been selected exemplarily, wherein the circuit tests to be performed are applicable not only to integrated circuits but in general to any electronic circuits. Thus, it only has to be kept in mind that the circuit is measured in a first circuit test in a state without an external disturbing quantity applying, such as, for example, in a low-stress condition, with predetermined ambient parameters, whereupon the circuit is measured in a second circuit test in a state with an external disturbing quantity applying, such as, for example, mechanical stress, again with the predetermined ambient parameters. Subsequently, the compensating control loop is set until both output signals detected of the circuit are matching. The inventive concept for compensating the influences of external disturbing quantities, such as, for example, mechanical stress in a semiconductor material, on the physical parameters of integrated circuits is now illustrated again for clarification in a summarized way.

Corresponding to the comparative example of the present invention, as has been illustrated in FIG. 1, an integrated circuit 100 for generating an output signal 116 depending on a physical useful quantity 108 comprises a first circuit part 102 and a second circuit part 104. The first circuit part 102 includes at least one output signal 116 depending on an operating parameter of the detecting means 106, which in turn is influenced by mechanical stress 118 ($\sigma$) on parts of the first circuit part 102, and at least one output signal 126 counteracting said influence of the output signal 116 by mechanical stress 118. The second circuit part 104 of the integrated circuit 100 maps at least one component of the mechanical stress condition 118 ($\sigma$) to the detecting means 106 of the first circuit part 102 on an input signal 112 supplied to the input 110 of the first circuit part 102. A compensating control loop including the operating parameter of the first circuit part 102, the mechanical stress condition a on parts of the first circuit part 102, the mechanical-thermal coupling between $\sigma$ and $\sigma'$, the stress $\sigma'$ on parts of the second circuit part, the stress sensor compensating circuit, output signal of the second circuit part and the detecting means of the first circuit part is then dimensioned in such a way that the output signal 116 of the integrated circuit 100 is to the largest degree possible independent of the mechanical stress condition $\sigma$ in the semiconductor material.

Thus, it must be considered that in this comparative example the compensating circuit illustrated above is not adjustable. It is set by circuit dimensioning such that the output signal 116 of the integrated circuit 100 is independent of the mechanical stress condition G in the semiconductor material. This will only work if all the electrical and mechanical-thermal parameters can be reproduced sufficiently well and are thus also sufficiently stable as far as technology is concerned.

According to the first embodiment of the present invention, the integrated circuit 150, as it is illustrated in FIG. 2, in addition to the integrated circuit 100 illustrated in FIG. 1 comprises a permanent memory 152 programmed after mounting the building block. All steps necessary to house a semiconductor chip in a casing and to provide it with electrical terminals are meant by mounting the building block. The data contents of the permanent memory influences at least one operating parameter of said compensating control loop. It is selected such that the output signal 116 of the integrated circuit 150 is to the largest extent possible independent of the mechanical stress condition a in the semiconductor material.

The adjustment of the compensating control loop takes place as follows. With a wafer test, a test point is performed where the integrated circuit is subjected to a condition Zw. In this context, all the physical ambient parameters influencing the function of the integrated circuit are referred to as conditions, such as, for example, ambient temperature, ambient moisture, electromagnetic fields, ambient pressure, supply voltage, electrical loads applied to the integrated circuit, maybe relevant memory contents of various registers in the integrated circuit or activated test modes. Thus, an output signal $S_{out}$ (Zw, wafer test) forms. After dicing the integrated circuit chip and after mounting the casing, an end test is performed where the integrated circuit is subjected to a condition Ze for a test point. An output signal $S_{out}$ ($Z_e$, end test) forms.

The relation of the output signals of the two conditions in the low-stress condition "wafer test" should then be known to a sufficiently precise and reliable extent, so that $S_{out}$ ($Z_e$, wafer test)=f ($S_{out}$ ($Z_w$, wafer test)) applies, wherein y=f(x) describes a functional connection in the sense that y unambiguously follows when knowing x. During the end test, an adjusting procedure is executed varying the operating parameter of the above-mentioned compensating control loop and finally selecting that optimum operating parameter for which the following applies: $S_{out}$ ($Z_e$, end test)–f ($S_{out}$ ($Z_w$, wafer test))=minimal. The operating parameter or an analogue/digital code for suitably influencing this operating parameter is then programmed into the permanent memory.

It is to be noted that an association, for each chip individually, of its wafer measuring result $S_{out}$ (Ze, wafer test) to $S_{out}$ (Ze, end test) must be obtained in order to be able to perform this adjusting. It is, however, not important how this association is executed in the end.

A further possibility according to the present invention is to perform the individual association of the wafer measuring results $S_{out}$ ($Z_w$, wafer test) to $S_{out}$ ($Z_e$ end test) by programming the wafer measuring results $S_{out}$ ($Z_W$, wafer test) in a coded form into a part of the memory area of the integrated circuit. Thus, the memory area of the integrated circuit can be a permanent memory, wherein this is preferably a re-writable memory (such as, for example, an EEPROM memory).

Another embodiment of the present invention is for the value $S_{out}$ (Zw, wafer test) to be a well-defined value not having any appreciable individual variations from chip to chip. This can be obtained by self-compensating measures or by further adjusting on the wafer level. Thus, the value $S_{out}$ (Ze, end test) is adjusted to the same well-defined value in all the integrated circuit ICs.

In case adjusting is performed on the wafer level, it is recommended to use an area and/or performance-optimized memory medium for the permanent storage of this adjustment value, such as, for example, laser fuses.

According to another embodiment of the present invention, as it is illustrated in FIG. 3, the integrated circuit according to the present invention in the first circuit part comprises an integrated Hall probe as well as electronic circuits for supplying it with electrical energy and electronic circuits for processing the output signal of the Hall probe. The first circuit part additionally has at least one output signal, which depends on the operating parameter, such as, for example, the magnetic sensitivity of the Hall probe.

The sensitivity of the Hall probe is, on the one hand, influenced by mechanical stress on the Hall probe, i.e. an effect known as the piezo-Hall effect, and on the other hand, the magnetic sensitivity of the Hall probe is also influenced by mechanical stress on the circuit for supplying the Hall probe with energy.

The first circuit part of the integrated circuit further includes at least one input signal counteracting the influence of the output signal by the external disturbing quantities mentioned above. The second circuit part of the integrated circuit includes at least one sensor element converting at least one component of the mechanical stress tensor acting on it into a sensor signal and supplying this signal to said input of the first circuit part. There is a predominantly deterministic relation between this component of the stress tensor at the location of the sensor element and at least one essential component of the stress tensor at the location of the Hall probe and/or at the location of the circuit for supplying the Hall probe with energy.

The compensating control loop including the operating parameter of the first circuit part—the mechanical stress on parts of the first circuit part—the mechanical-thermal coupling between the mechanical stress—the mechanical stress on parts of the second circuit part—the stress sensor—the sensor signal—the input signal of the first circuit part—parts of the first circuit part acting on the input signal is then dimensioned in such a way that the output signal of the first circuit part is, to the largest extent possible, independent of the mechanical stress of the integrated circuit chip, as are, for example, caused by the IC casing.

The integrated circuit further comprises a permanent memory programmed after mounting the building block. The contents of the permanent memory influences at least one parameter of the above compensating control loop. It is selected such that the output signal of the integrated circuit is to the largest extent possible independent of the mechanical stress condition of the semiconductor material.

The adjustment according to the present invention takes place as follows in an integrated Hall sensor assembly. For the wafer test, a test point is performed where the integrated circuit chip is subjected to a condition Z characterized by a defined magnetic field, a defined temperature, a defined supply voltage, a defined switching and a defined content including all the active memory cells. Thus, an output signal $S_{out}$ (Z, wafer test) forms. After dicing the integrated circuit chips and after mounting the casing, an end test is performed wherein the integrated circuit chip is subjected to the same conditions Z for a test point. Then an output signal $S_{out}$ (Z, end test) forms.

Only an adjusting procedure varying the operating parameter of the above compensating control loop and finally selecting that optimum operating parameter for which it applies that $S_{out}$ (Z, end test)–$S_{out}$ (Z, wafer test) is minimal takes place during the end test. The operating parameter or an analogue/digital code for suitably influencing this operating parameter is then programmed into the permanent memory.

It is also to be noted that the expressions "wafer test" and "end test" used for the individual circuit tests have only been selected exemplarily. Thus, the circuit tests to be performed are applicable not only to integrated circuits but in general to any electronic circuits. The only prerequisite is that the output signal of the circuit be detected in a first circuit test without any external disturbing quantities applying, such as, for example, in a low-stress condition, with predetermined ambient parameters, whereupon the output signal of the circuit is detected again in a second circuit test in a state with an external disturbing quantity applying, such as, for example mechanical stress, again with predetermined ambient parameters. Subsequently, the compensating control loop is set until both output signals detected of the circuit are matching.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

I claim:

1. A circuit for generating an output signal, which depends on a physical useful quantity, comprising:
    means for detecting the physical useful quantity, wherein the means for detecting is arranged to generate an output signal, which depends on the physical useful quantity, on a control signal for the means for detecting and, with an unchanged control signal, on an external disturbing quantity;
    sensor means for detecting the external disturbing quantity and for providing a sensor signal, which depends on the external disturbing quantity; and
    means for processing the sensor signal to influence the on the sensor signal such that the disturbing quantity on the output signal is reduced;
    wherein the circuit further comprises a memory in which information indicating the influence of the external disturbing quantity on the sensor signal, the control signal and/or the output signal can be stored.

2. The circuit according to claim 1, wherein the circuit is an integrated circuit on a semiconductor substrate.

3. The circuit according to claim 2, wherein the external disturbing quantity is a mechanical stress in the semiconductor substrate influencing the output signal, wherein the sensor means for detecting the external disturbing quantity is a stress sensor for detecting at least one component of the mechanical stress in the semiconductor material.

4. The circuit according to claim 2, wherein the means for detecting a physical useful quantity and the means for detecting the external disturbing quantity are arranged on the semiconductor substrate such that the external disturbing quantity influencing the output signal of the circuit is in an essentially deterministic relation to the external disturbing quantity detected by the sensor means.

5. The circuit according to claim 4, wherein the deterministic relation is taken into account by the processing means to generate the control signal.

6. The circuit according to claim 1, wherein the means for detecting a useful quantity and the sensor means for detecting the external disturbing quantity are arranged on the semiconductor substrate in an interleaved way or adjacent to each other.

7. The circuit according to claim 1, housed in a casing, wherein information indicating the influence of the external disturbing quantity due to the housing of the circuit in a casing can be stored in the memory.

8. The. circuit according to claim 1, further comprising compensating means, which influences the control signal dependent on the information stored in the memory to compensate the influence of the external disturbing quantity on the output signal due to the housing of the circuit in a casing.

9. The circuit according to claim 8, wherein the compensating means acts on the sensor means to influence the sensor signal of the sensor means.

10. The circuit according to claim 8, wherein the compensating means acts on the means for processing the sensor signal of the sensor means to influence the output signal of the second circuit part.

11. The circuit according to claim 1, comprising an integrated Hall sensor assembly, wherein the physical useful quantity is a magnetic field to be detected and the output signal is a Hall voltage.

12. The circuit according to claim 11, wherein the integrated Hall sensor assembly comprises:

a Hall sensor element, means for supplying the Hall sensor element with energy, and means for processing the output signal of the Hall sensor element.

13. The circuit according to claim 11, wherein the Hall sensor element, the means for supplying the Hall sensor element and the means for processing the output signal of the Hall sensor element are controllable, wherein data is stored in the memory, on the basis of which the Hall sensor element, the means for supplying the Hall sensor element and the means for processing are controllable.

14. A method for generating an output signal, which depends on a physical useful quantity, comprising the steps of:

detecting the physical useful quantity to generate an output signal, which depends on the physical useful quantity, on a control signal and, with an unchanged control signal, on an external disturbing quantity;

detecting the external disturbing quantity and providing a sensor signal, which depends on the external disturbing quantity;

processing the sensor signal to influence the control signal dependent on the sensor signal such that the influence of the external disturbing quantity on the sensor signal, the control signal and/or the output signal is reduced; and storing information indicating the influence of the external disturbing quantity on the output signal.

15. The method according to claim 14, further comprising the steps of:

detecting the output signal in dependence on circuit and ambient parameters in a first circuit test without an external disturbing quantities applying;

storing the parameters in a memory;

detecting the output signal of the circuit in a second circuit test with an external disturbing quantity applying; and adjusting the control signal until the output signal of the circuit in the first circuit test is essentially matching the output signal in the second circuit test.

16. The method according to claim 15, wherein the circuit is an integrated circuit, wherein the first circuit test is a wafer test on the wafer level, and wherein the second circuit test is an end test of the integrated circuit housed in a casing.

* * * * *